United States Patent
Harris et al.

(10) Patent No.: US 12,012,203 B2
(45) Date of Patent: Jun. 18, 2024

(54) UNMANNED AERIAL VEHICLE FOLDING LANDING GEAR

(71) Applicants: Benjamin Harris, Casselberry, FL (US); Ethan Camp Wash, Casselberry, FL (US)

(72) Inventors: Benjamin Harris, Casselberry, FL (US); Ethan Camp Wash, Casselberry, FL (US)

(73) Assignee: Harris Aerial LLC, Casselberry, FL (US)

( * ) Notice: Subject to any disclaimer, the term of this patent is extended or adjusted under 35 U.S.C. 154(b) by 271 days.

(21) Appl. No.: 17/716,834

(22) Filed: Apr. 8, 2022

(65) Prior Publication Data
US 2022/0227485 A1    Jul. 21, 2022

Related U.S. Application Data

(63) Continuation-in-part of application No. 17/012,513, filed on Sep. 4, 2020, now Pat. No. 11,319,046, and a continuation-in-part of application No. 16/104,723, filed on Aug. 17, 2018, now Pat. No. 10,994,833, and a continuation-in-part of application No. 15/842,386, filed on Dec. 14, 2017, now Pat. No. 10,780,970, said application No. 16/104,723 is a continuation-in-part of application No. 15/265,948, filed on Sep. 15, 2016, now Pat. No. 10,266,245, said application No. 15/842,386 is a continuation-in-part of application No. 15/265,948, filed on Sep. 15, 2016, now Pat. No. 10,266,245.

(Continued)

(51) Int. Cl.
*B64C 25/10* (2006.01)
*B64C 39/02* (2023.01)

(52) U.S. Cl.
CPC ............ *B64C 25/10* (2013.01); *B64C 39/024* (2013.01)

(58) Field of Classification Search
CPC ... B64C 25/10; B64C 2201/128; B64C 1/061; B64C 1/063
See application file for complete search history.

(56) References Cited

U.S. PATENT DOCUMENTS

| | | |
|---|---|---|
| 7,979,960 B2 | 7/2011 | Sano et al. |
| 2012/0083945 A1 | 4/2012 | Oakley et al. |

(Continued)

*Primary Examiner* — Tye William Abell
(74) *Attorney, Agent, or Firm* — Jason T. Daniel, Esq.; Daniel Law Offices, P.A.

(57) ABSTRACT

A heavy-lift UAV frame includes a central frame portion and a pocket area for receiving an avionics package. Top and bottom plates are secured to the central frame portion and include four corner members that extend diagonally outward therefrom. A plurality of boom hinges are interposed between each of the corner members pivot a boom arm between an extended position for flight and a retracted position for storage and transport. Each boom arm and hinge combination includes a complementary dimension to one side of the central frame portion to position a boom arm parallel thereto when in the retracted position. A plurality of landing gear hinges are positioned along the bottom of the frame and transition a plurality of landing gear legs between a ready for flight position and a storage position. In the storage position each of the legs are positioned diagonally beneath the central frame portion.

11 Claims, 14 Drawing Sheets

Related U.S. Application Data

(60) Provisional application No. 62/318,918, filed on Apr. 6, 2016.

(56) References Cited

U.S. PATENT DOCUMENTS

| | | |
|---|---|---|
| 2013/0193269 A1 | 8/2013 | Zwaan et al. |
| 2015/0259066 A1* | 9/2015 | Johannesson ............ B64C 1/30 |
| | | 244/17.27 |
| 2015/0321755 A1* | 11/2015 | Martin .................... B64C 27/08 |
| | | 244/17.23 |
| 2015/0321758 A1 | 11/2015 | Sarna |
| 2016/0122016 A1 | 5/2016 | Mintchev et al. |
| 2016/0152316 A1 | 6/2016 | Wang et al. |
| 2016/0167776 A1 | 6/2016 | Shaw |
| 2016/0325834 A1 | 11/2016 | Foster |
| 2016/0339789 A1 | 11/2016 | Wang et al. |
| 2016/0376004 A1 | 12/2016 | Claridge et al. |
| 2017/0085840 A1 | 3/2017 | Mizushina et al. |
| 2017/0158328 A1 | 6/2017 | Foley |
| 2017/0183074 A1* | 6/2017 | Hutson .................. B64C 39/02 |
| 2017/0203843 A1 | 7/2017 | Chan et al. |
| 2017/0253324 A1* | 9/2017 | Zhao ...................... B64C 25/12 |
| 2017/0267334 A1 | 9/2017 | Tsai |
| 2018/0002023 A1 | 1/2018 | Tian et al. |
| 2018/0016027 A1 | 1/2018 | Cheatham et al. |
| 2018/0370618 A1* | 12/2018 | Harris .................. B64C 39/024 |

* cited by examiner

UNMANNED AERIAL VEHICLE FOLDING LANDING GEAR

CROSS-REFERENCE TO RELATED APPLICATIONS

This application claims the benefit of U.S. Application Ser. No. 62/318,918 filed on Apr. 6, 2016, U.S. Pat. No. 10,266,245 filed on Sep. 15, 2016, U.S. Pat. No. 10,994,833 filed on Aug. 17, 2018, and is a continuation-in-part to copending U.S. patent application Ser. No. 17/012,513 filed on Sep. 4, 2020, the contents of each of which are incorporated herein by reference.

TECHNICAL FIELD

The present invention relates generally to aerial vehicles, and more particularly to a folding landing gear for a heavy-lift UAV.

BACKGROUND

The statements in this section merely provide background information related to the present disclosure and may not constitute prior art.

An unmanned aerial vehicle (UAV) is a heavier-than-air flying machine that does not carry a human operator. UAV's are utilized for many different military and civilian applications such as reconnaissance, surveillance, area mapping, and/or photography, for example.

Traditionally, the use and implementation of hobby grade vertical takeoff and landing UAV's was severely limited by the relatively low lifting capacity of the same. However, recent advancements have seen the introduction of small size UAV engines which can carry payloads exceeding 30-50 pounds each, and for prolonged periods of time. As such, UAV's are now being contemplated for use in new industries, and for performing tasks never before possible. In this regard, a heavy-lift UAV is one that is capable of performing sustained flight with payloads greater than 25 pounds. Several examples include equipping a heavy-lift UAV with an agricultural spraying module, LIDAR remote sensing equipment, or a payload basket for transporting goods from one location to another.

Although such applications are promising, the current design and construction of UAV landing gear systems is not conducive for heavy-lift applications that require compact storage between flights. This is because such systems fold the gear outward (e.g., away from the drone body) and occupy a stored footprint that is often 2-3 times the footprint of the drone body itself. Moreover, such systems typically require a separate mounting bracket and often comprise a complex network of interconnected components wherein a single failure point in one component jeopardizes the ability of the remaining landing gear legs from functioning properly.

The present invention directed to a heavy-lift UAV frame mounted landing gear system differs from the conventional art in a number of aspects. The manner by which will become more apparent in the description which follows, particularly when read in conjunction with the accompanying drawings.

SUMMARY OF THE INVENTION

The present invention is directed to a heavy-lift UAV frame. One embodiment of the present invention can include a central frame portion having a symmetrical shape and forming a pocket area for receiving an avionics package. A top and bottom plate can be secured to the central frame portion and can include four corner members extending diagonally outward therefrom.

Another embodiment of the present invention can include a plurality of boom hinges that are interposed between each of the corner members and an elongated boom arm. Each of the boom hinges can be pivotally connected to the boom arms and can transition the boom arms between an extended position for flight and a retracted position for storage and transport. Each boom arm and boom hinge can include a complementary dimension to one side of the central frame portion so as to arrange each boom arm parallel thereto when in the retracted position.

Another embodiment of the present invention can include a plurality of elongated landing gear legs that are each connected to the bottom end of the main body by a folding landing gear hinge. Each of the landing gear legs can independently transform between a ready for flight position and a storage position. In the ready for flight position, the gear legs can be positioned diagonally away from each corner of the main body, and in the storage position each of the gear legs can be positioned beneath the main body.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1A:
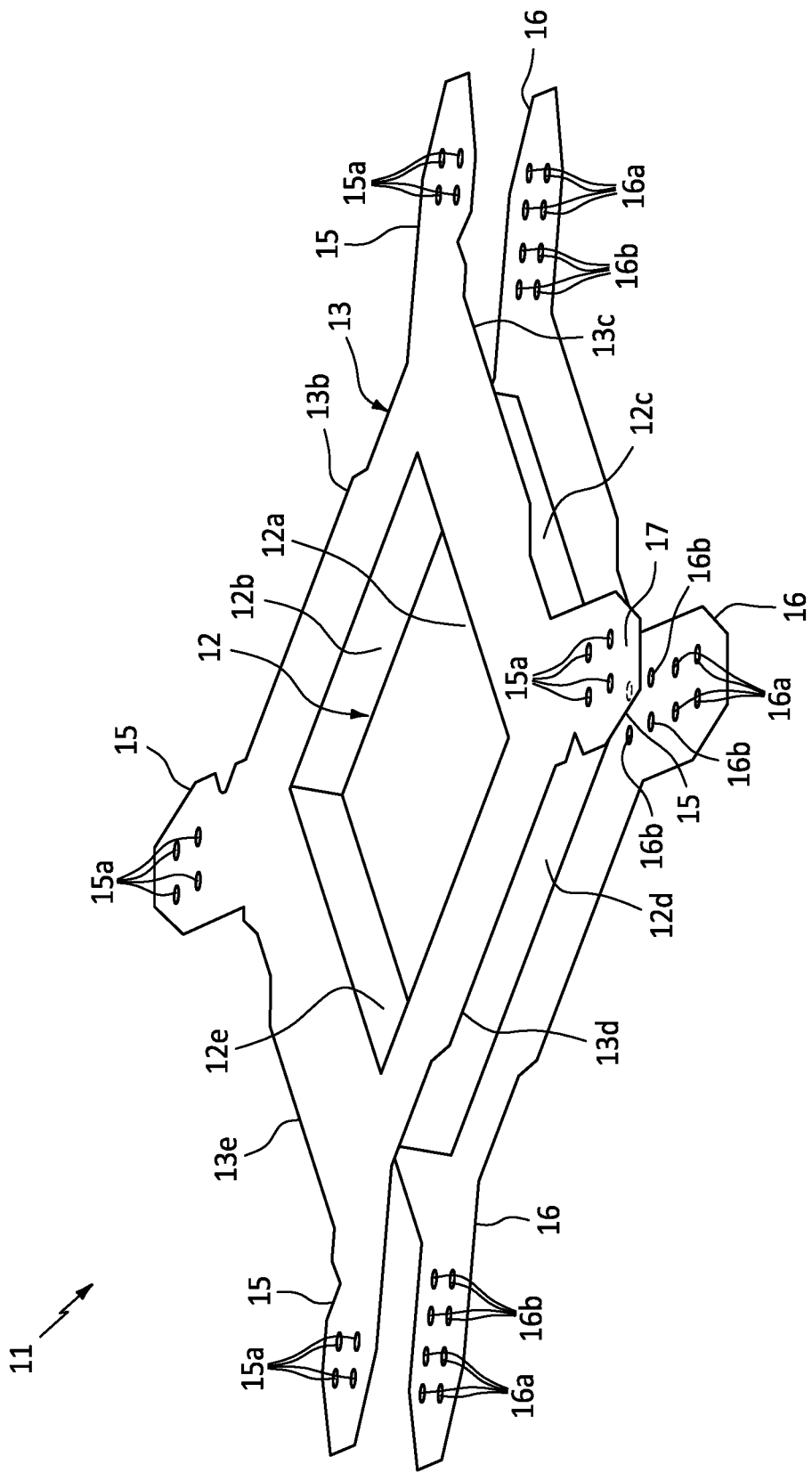
FIG. 1A is a perspective view of the top side of the central frame portion that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1A.

As described throughout this document, the term "complementary dimension," shall be used to describe a situation wherein an object includes a size that is identical to, or substantially identical to the size of another component, in terms of length, and/or width, and/or height, for example.

As described throughout this document, a "small UAV" is described as any unmanned aerial vehicle having a total footprint of less than 6 feet in diameter, and a total unit weight of less than 60 pounds.

As described herein, the term "removably secured," "removably engaged" and derivatives thereof shall be used to describe a situation wherein two or more objects are joined together in a non-permanent manner so as to allow the same objects to be repeatedly joined and separated. This can be accomplished through the use of any number of commercially available connectors such as opposing strips of hook and loop material (i.e. Velcro®), magnetic elements, and compression fittings such as hooks, snaps and buttons, for example.

As described herein, the term "pivotally connected," "rotatably secured" and all derivatives shall be used interchangeably to describe a situation wherein two or more objects are joined together in a manner that allows one or both of the objects to pivot and/or rotate about or in relation to the other object along one or more axes.

FIGS. 1A-8B illustrate various embodiments of heavy lift UAV system 10 that is useful for understanding the inventive concepts disclosed herein. As shown, the device 10 can include, essentially a main body 11 having a plurality of booms 21, and a plurality of landing gear legs 50 that are pivotally secured thereon.

Figure 1B:
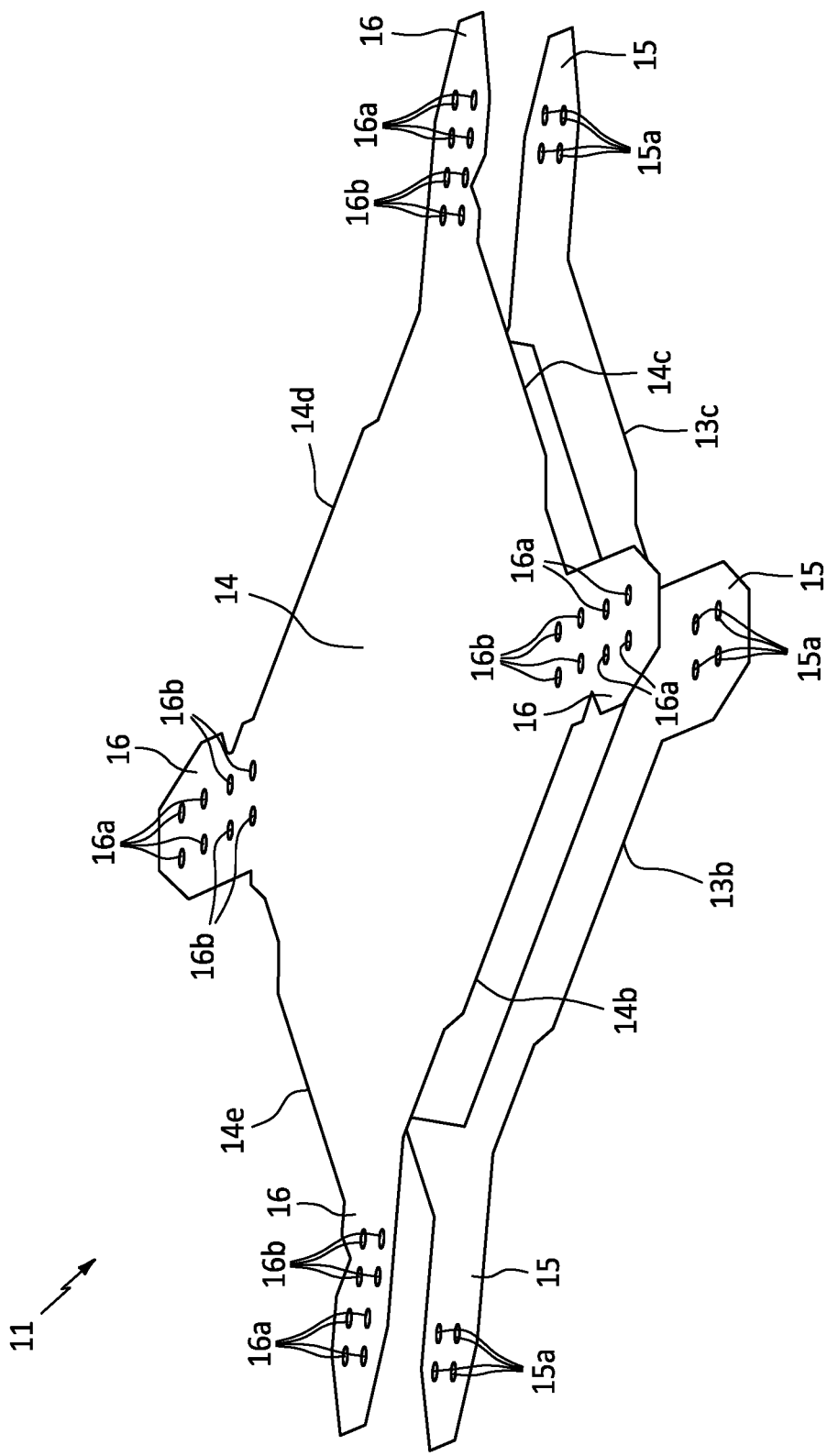
FIG. 1B is a perspective view of the bottom side of the central frame portion, in accordance with one embodiment of the invention.

As shown best in FIGS. 1A and 1B, the main body 11 can include a generally square shaped central body portion 12 for receiving and storing any type of avionics. As such, the central body portion can include a recessed bottom wall 12a and a plurality of raised side walls 12b, 12c, 12d, and 12e. By encircling the delicate avionics within the rigid frame members of the central body portion 12, the main body 11 advantageously forms a pocket area that can protect and shelter the delicate components from being directly impacted by another object in the event of a crash.

The main body can also include a top plate 13 having edges 13b, 13c, 13d and 13e, and a bottom plate 14 having edges 14b, 14c, 14d and 14e. Top and bottom edges 13b-13e and 14b-14e being arranged so as to extend outward from the central walls 12b-12e, respectively. As shown, each of the top and bottom plates can also include corner members 15 and 16, respectively, which extend diagonally outward from the central portion 12.

The distal ends of the top and bottom corner members can include a plurality of apertures 15a and 16a, respectively, that are aligned vertically so as to receive the below described boom hinges 30 along each corner. Additionally, the bottom plate 16 can include a plurality of apertures 16b so as to receive the below described gear hinges 60 along each corner.

In the preferred embodiment, the main body 11 can be constructed from a lightweight and sturdy material such as aluminum, for example, however other construction materials such as plastic, carbon fiber and other forms of composite materials are also contemplated. The central body portion 12, the top plate 13 and the bottom plate 14 can be constructed from identical or different materials and can be secured together in any number of commercially known manners.

Figure 2:
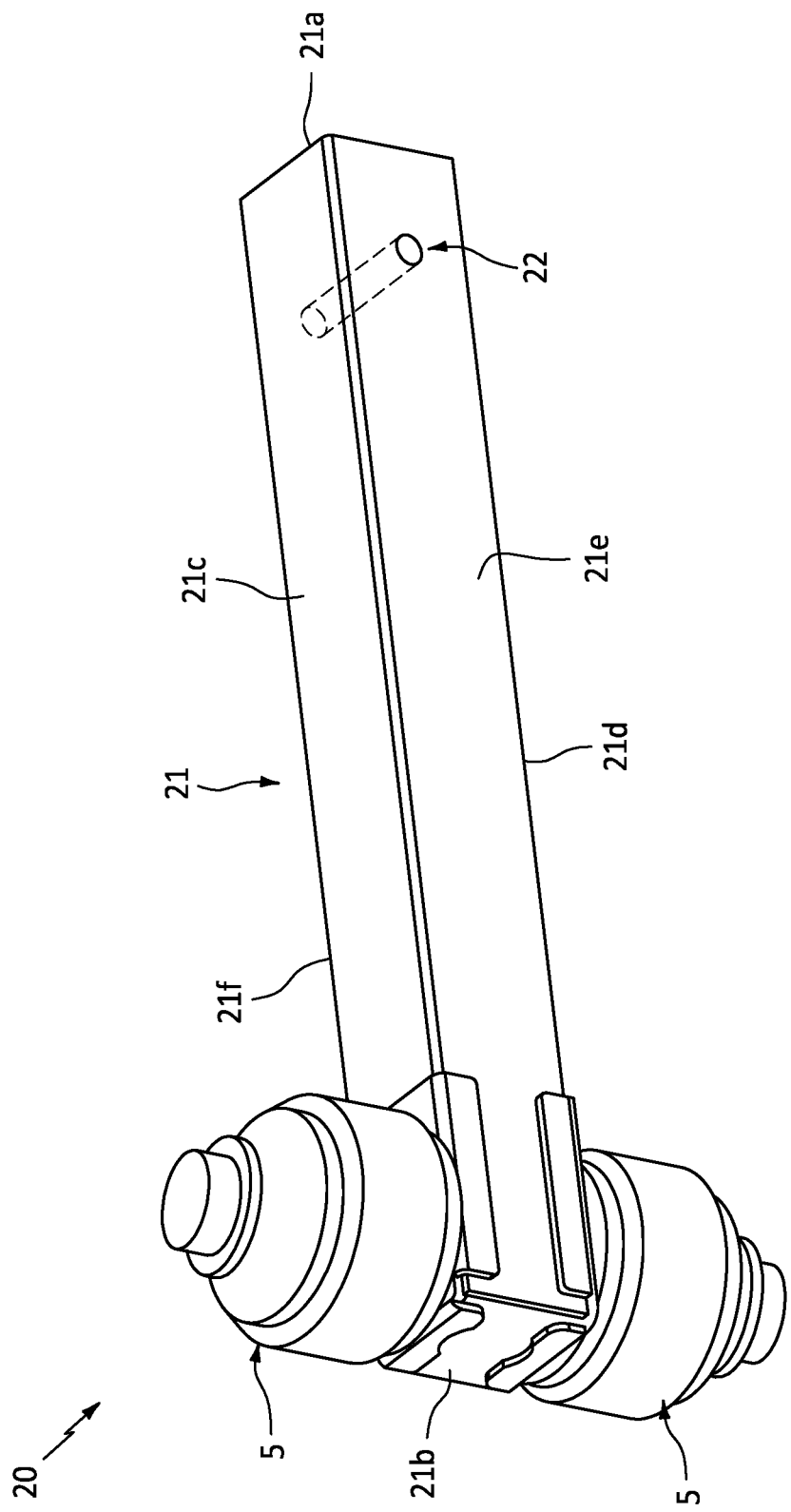
FIG. 2 is a perspective view of a boom arm of the heavy-lift UAV frame, in accordance with one embodiment of the invention.

FIG. 2 illustrates one embodiment of a boom arm 20 which can be pivotally secured onto each corner of the main body via the below described boom hinge 30. As shown, the boom can include an arm member 21 that is preferably in the shape of a hollow square tube, having a first end 21a, a second end 21b a top surface 21c a bottom surface 21d and a pair of side surfaces 21e and 21f. The second end of the boom arm 21b can function to receive and securely position a pair of electric engines 5 along both the top and bottom surfaces thereof. When such engines are installed, the engine control cables (not illustrated) can be routed through the hollow portion of the arm and hinge for connection to an avionics package located on the main body 11. The first end of the boom arm 21a can include a horizontal channel 22 for receiving a locking shaft of the boom hinge.

Figure 3A:
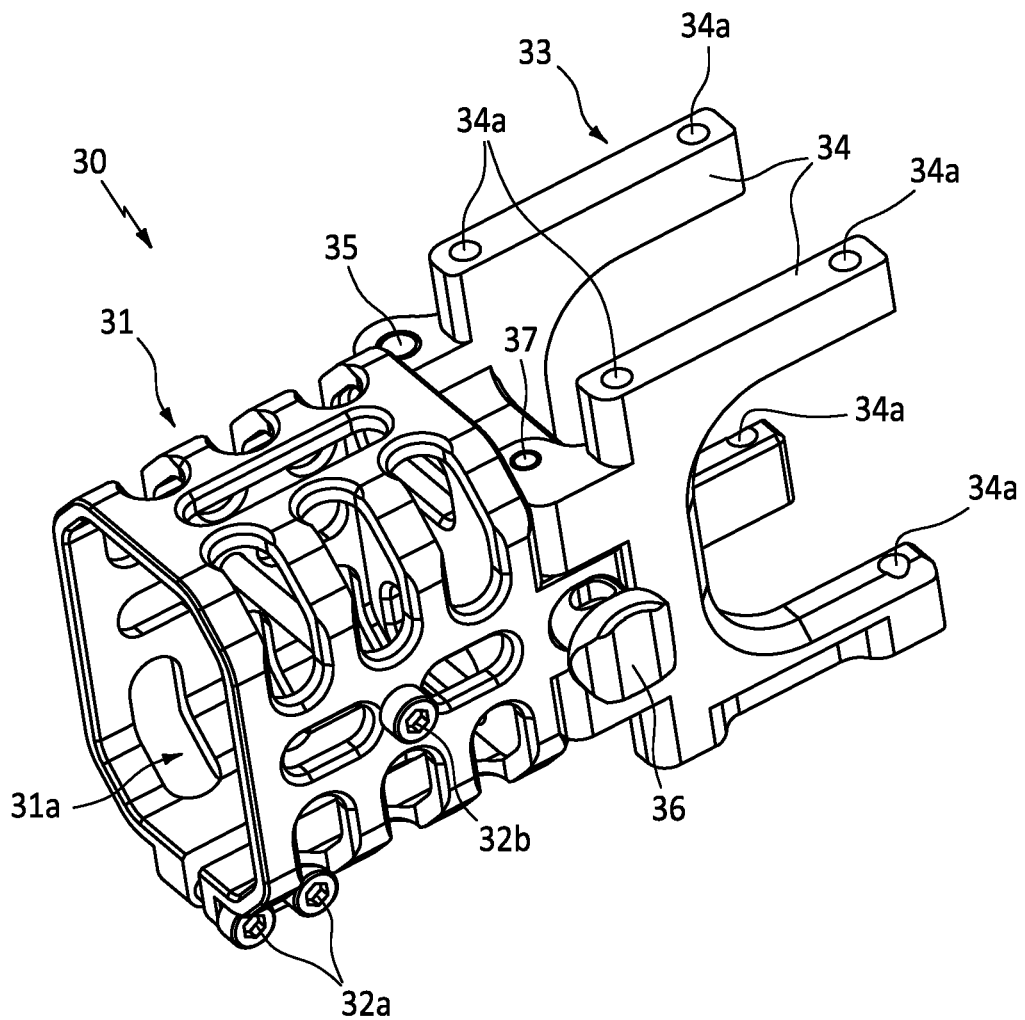
FIG. 3A is a perspective view of a boom hinge of the heavy-lift UAV frame in the open position, in accordance with one embodiment of the invention.
Figure 3B:
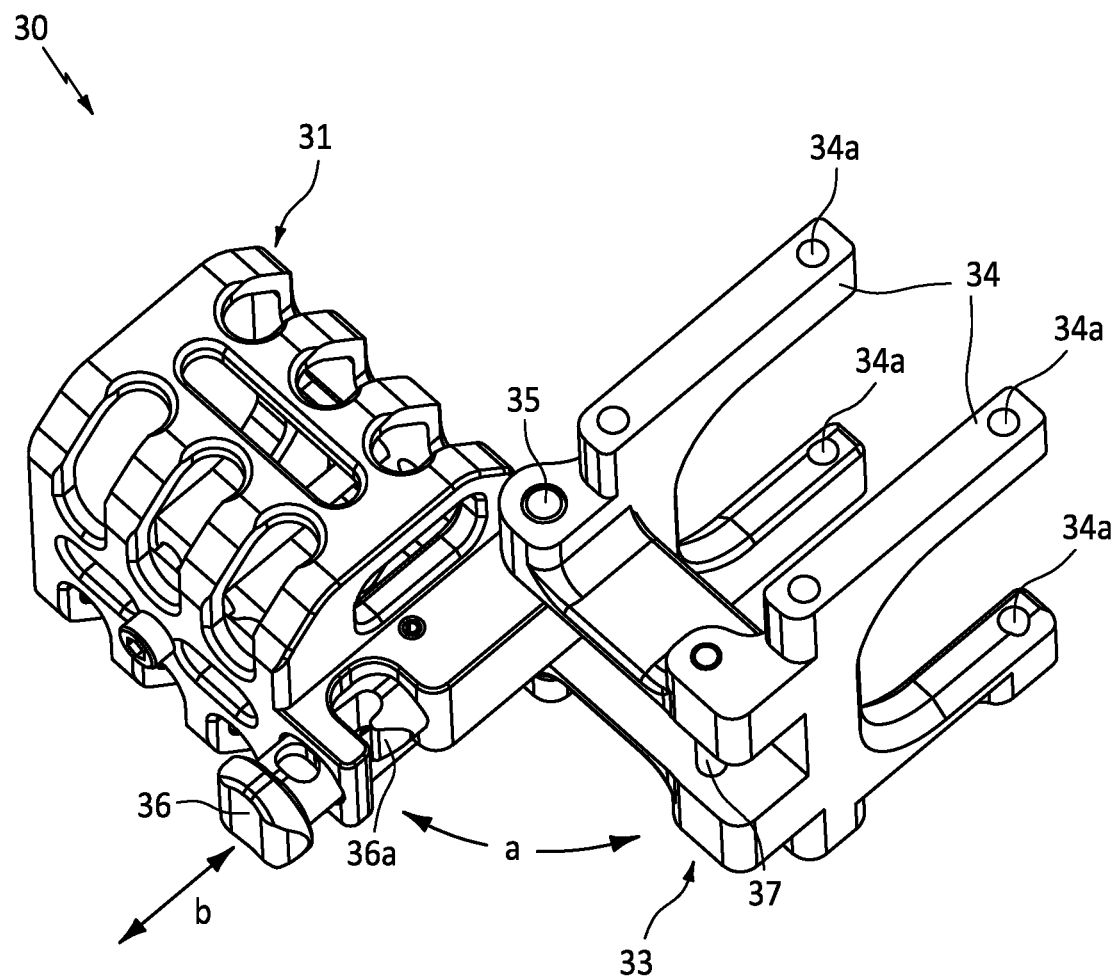
FIG. 3B is a perspective view of a boom hinge of the heavy-lift UAV frame in the closed position, in accordance with one embodiment of the invention.

FIGS. 3A and 3B illustrate one embodiment of a boom hinge 30. As shown, the hinge 30 can include a first body section 31 having an open first end that leads to a hollow interior space 31a for receiving the first end 21a of a boom arm 20. A pair of boom clamping screws 32a are provided so as to allow a user to tighten the hinge onto a boom arm that is positioned within the hollow interior space. Likewise, an elongated safety screw 32b is removably positioned through the horizontal channel 22 of the boom arm secured within the hollow interior space to prevent separation of the arm and hinge.

The boom hinge can also include a second body section 33 having a pair of generally U-shaped protrusions 34 each having apertures 34a extending therethrough. Apertures 34a including a shape, size and orientation that are complementary to the shape, size and orientation of apertures 15a and 16a, so as to receive mounting hardware 34b therethrough.

As shown best at FIG. 3B, a pivoting pin 35 can be positioned between the first and second body sections 31 and 33, respectively, to permit both sections to pivot (see arrow a), relative to the other. In one embodiment, a spring-loaded sliding locking pin 36 can be positioned along the first body member. The lock pin can include an opening 36a for selectively engaging a retainment pin 37 that is positioned on the second body section 33. When the lock pin 36 is secured onto the retainment pin 37, the hinge is immobilized. In this regard, the hinge can transition from the open position shown at FIG. 3A and the folded position shown at FIG. 3B via movement (see arrow b) of the lock pin 36. Moreover, it is noted that movement of the hinge is perpendicular to the lifting force applied by the boom arms onto the main body. As such, the boom hinge has no excessive play/vertical slop, and therefore reduces or eliminates problematic vibrations of the boom arms noted above.

Figure 4A:
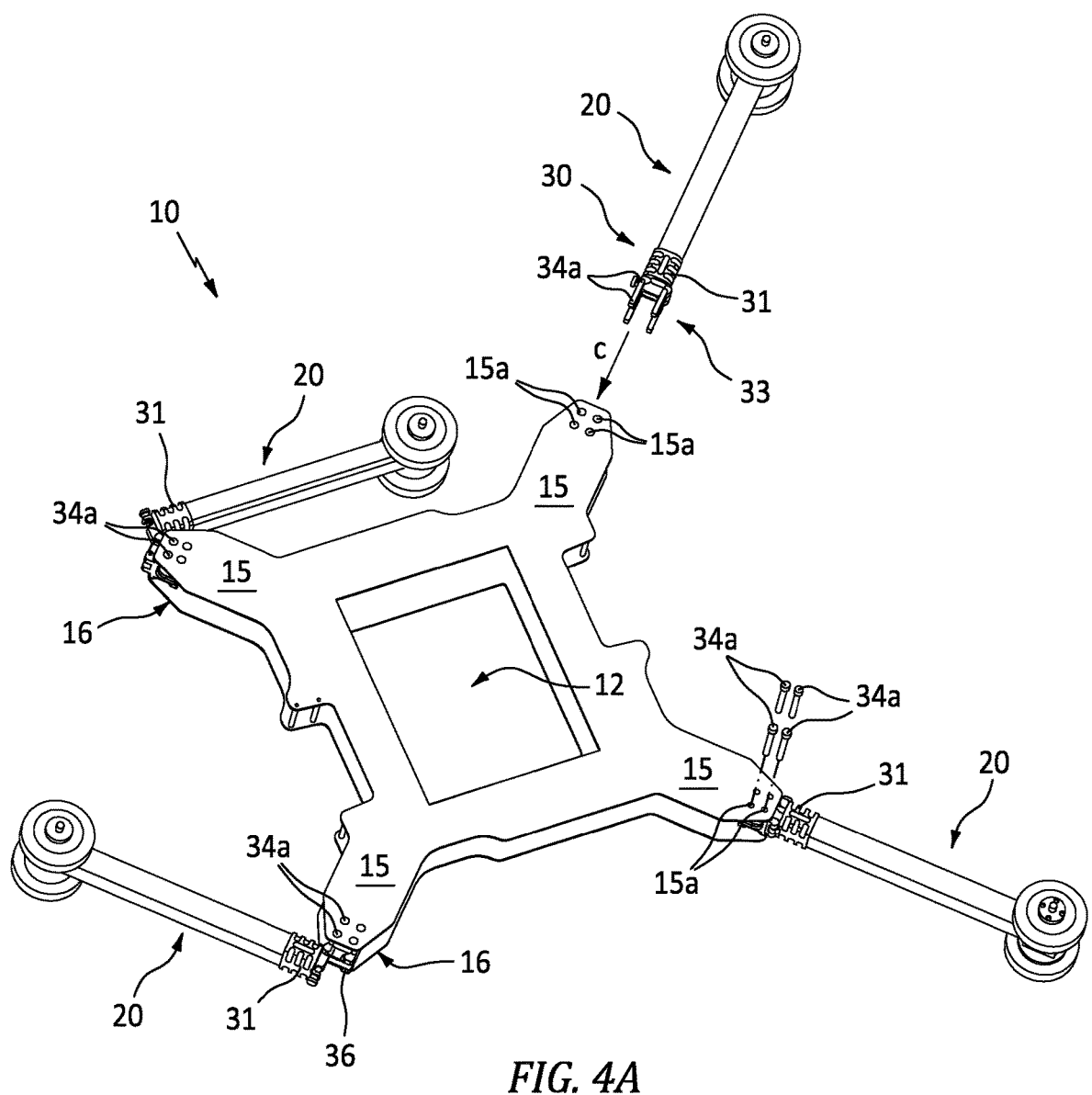
FIG. 4A is an exploded parts view of the heavy-lift UAV frame, in accordance with one embodiment of the invention.
Figure 4B:
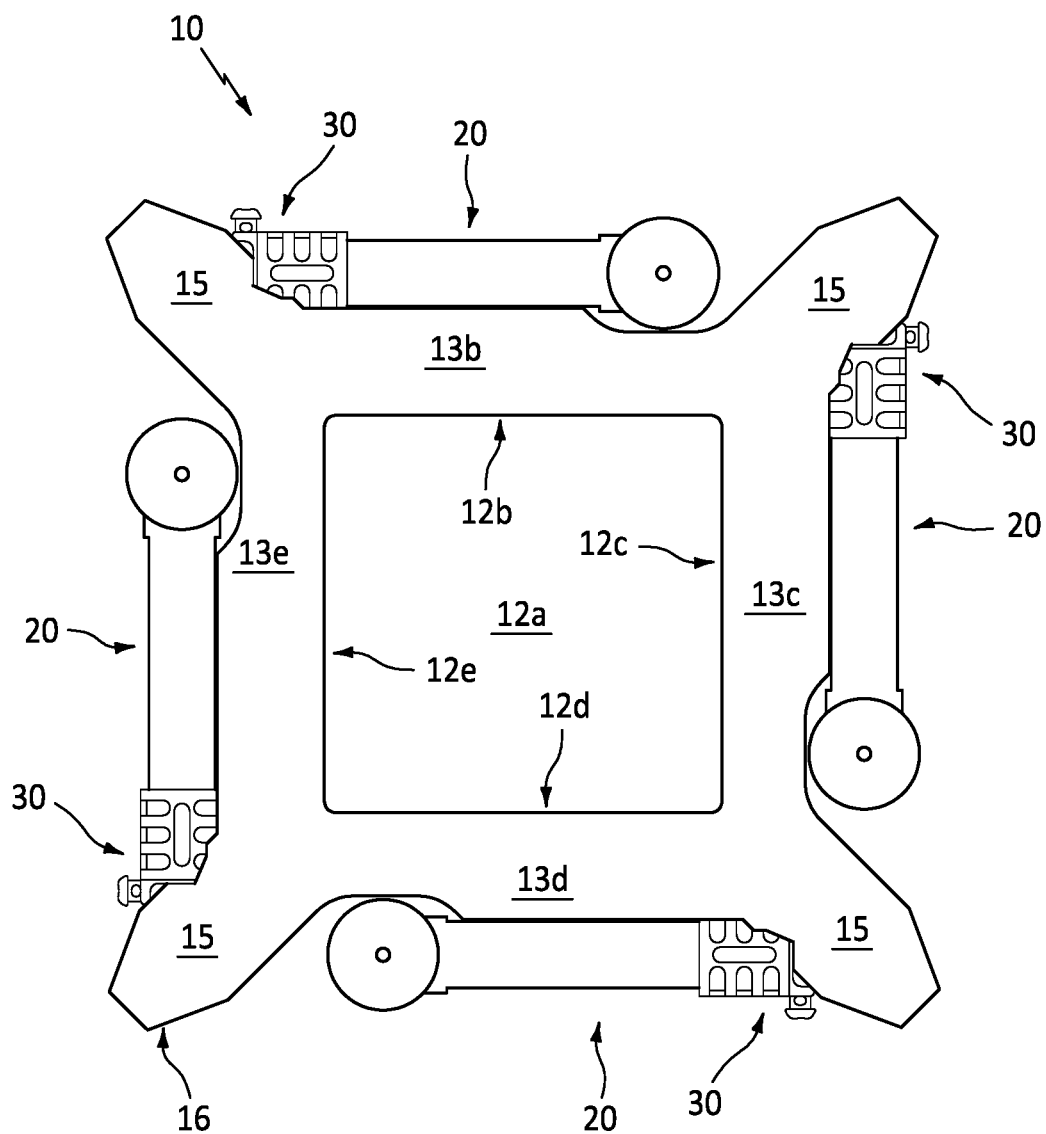
FIG. 4B is a perspective view of the heavy-lift UAV frame in the retracted position, in accordance with one embodiment of the invention.
Figure 4C:
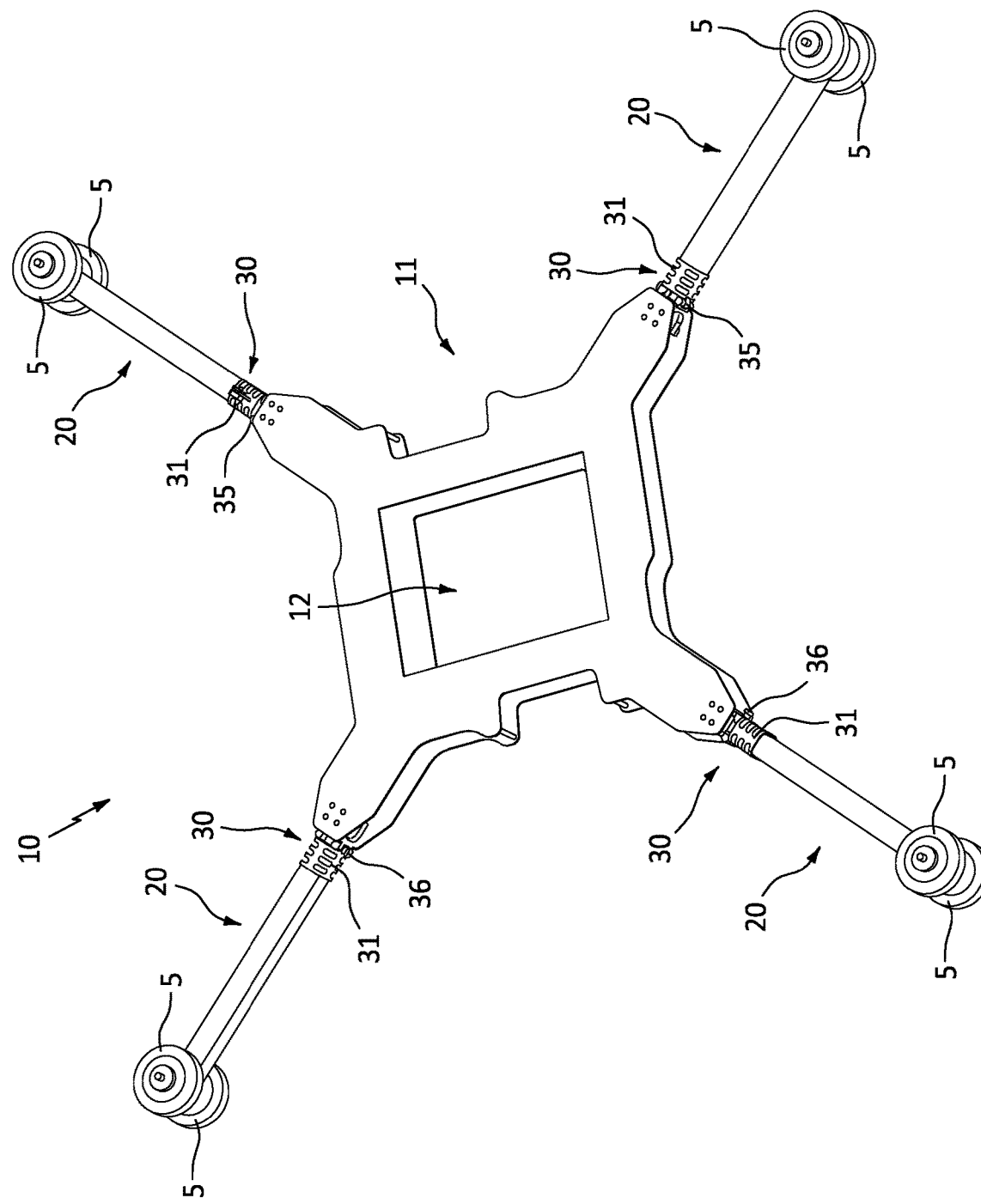
FIG. 4C is a perspective view of the heavy-lift UAV frame in the extended position, in accordance with one embodiment of the invention.

As shown in FIGS. 4A-4C, the heavy-lift UAV frame 10 can include four boom arms 20 which can be pivotally secured onto the corner of the main body via the above-described boom hinges. As shown best in FIG. 4A, the first end of each boom arm can be positioned inside the first end of the boom hinge 31, and the second end of each boom hinge 33 can be positioned between the corner members 15 and 16 (See arrow c). At this time, apertures 34a, 15a and 16a will be aligned vertically, and can function to receive mounting hardware 34a, such as the illustrated screws, for example, to prevent inadvertent separation of the hinge and frame. When fully installed, the hinge 30 can pivot each boom arm horizontally between a fully extended position and a fully retracted position.

As shown in FIG. 4B, each hinge 30 and attached boom arm 20 can include a length/assembled dimension (e.g., distance between elements 33 and 21b) that is complementary to the length of one side of the central body walls 12b-12e and/or edges 13b-13e and 14b-14e. This dimension, combined with the symmetrical square shape of the central body portion, advantageously allows the assembled frame 10 to transition to a fully retracted position, wherein each boom arm 20 can be pivoted until it is located parallel with one side of the central body portion 12b-12e and/or edges 13b-13e and 14b-14e, respectively. When so positioned, the corner members 15 and 16 will be the outermost components of the frame. Such a design advantageously allows the sturdy corner members to protect the boom arms against impacts with foreign objects when the frame member is retracted for storage and/or transport.

FIG. 4C illustrates one embodiment of the frame 10 in the fully extended position, wherein each of the boom arms are extending outward from the corner of the main body and are locked in place by the locking pin 36 and retainment pin 37 of the boom hinge 30. As each of the boom hinge and arm combination includes a length that is complementary to the length of each of the side walls of the central body portion 12, the frame remains completely symmetrical from each side when fully extended. This symmetrical design combined with the absence of slop within the boom hinge advantageously eliminates much of the vibrations that are experienced by other known devices, as each of the engines 5 are positioned at a uniform distance from each other and the payload/avionics being carried by the central portion of the frame 12.

Figure 5:
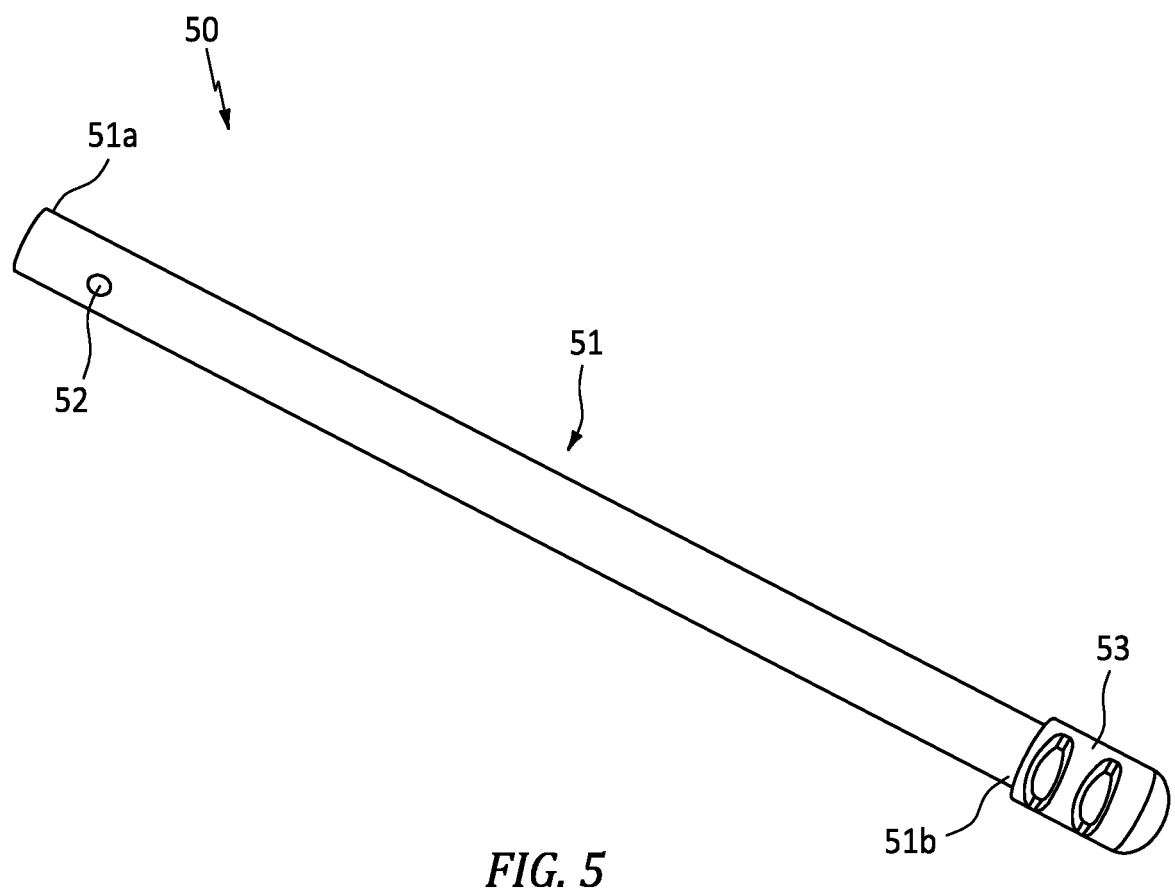
FIG. 5 is a perspective view of a landing gear leg of the heavy-lift UAV frame, in accordance with one embodiment of the invention.

FIG. 5 illustrates one embodiment of an individual landing gear leg 50 which can be pivotally secured onto each corner of the main body via the below described landing gear hinge 60. As shown, the leg can include an elongated member 51 that is preferably in the shape of a hollow round tube, having a first end 51a, and a second end 51b. In one embodiment, the first end of the gear leg 51a can include a horizontal channel 52 for receiving a locking screw of the gear hinge. In various embodiments, the second end of the leg 51b can function to receive a surface contact plate as the illustrated cap 53 which can be constructed from or can include a non-skid material such as rubber, for example.

Of course, other embodiments are contemplated wherein different types of surface contact plates are utilized. Several nonlimiting examples include the use of wheels for permitting the drone to taxi, floats for permitting the drone to land on water, and/or an elongated generally flat plate which can be hingedly or fixedly connected along the distal end of each leg 51b for use in winter conditions to permit the drone to land and takeoff from snow without sinking into the same.

Although dimensions are not critical, in the preferred embodiment, the main body 11 can preferably include a diagonal length between each corner section of approximately 30 inches. Likewise, each boom 20 and hinge 30 combination can preferably include a length of approximately 24 inches from end to end. Such dimensions being suitable for allowing each boom to support two engines having 32-inch propellers giving the frame a lifting capacity of over 1,000 pounds. Of course, other sizes are also contemplated.

Figure 6:
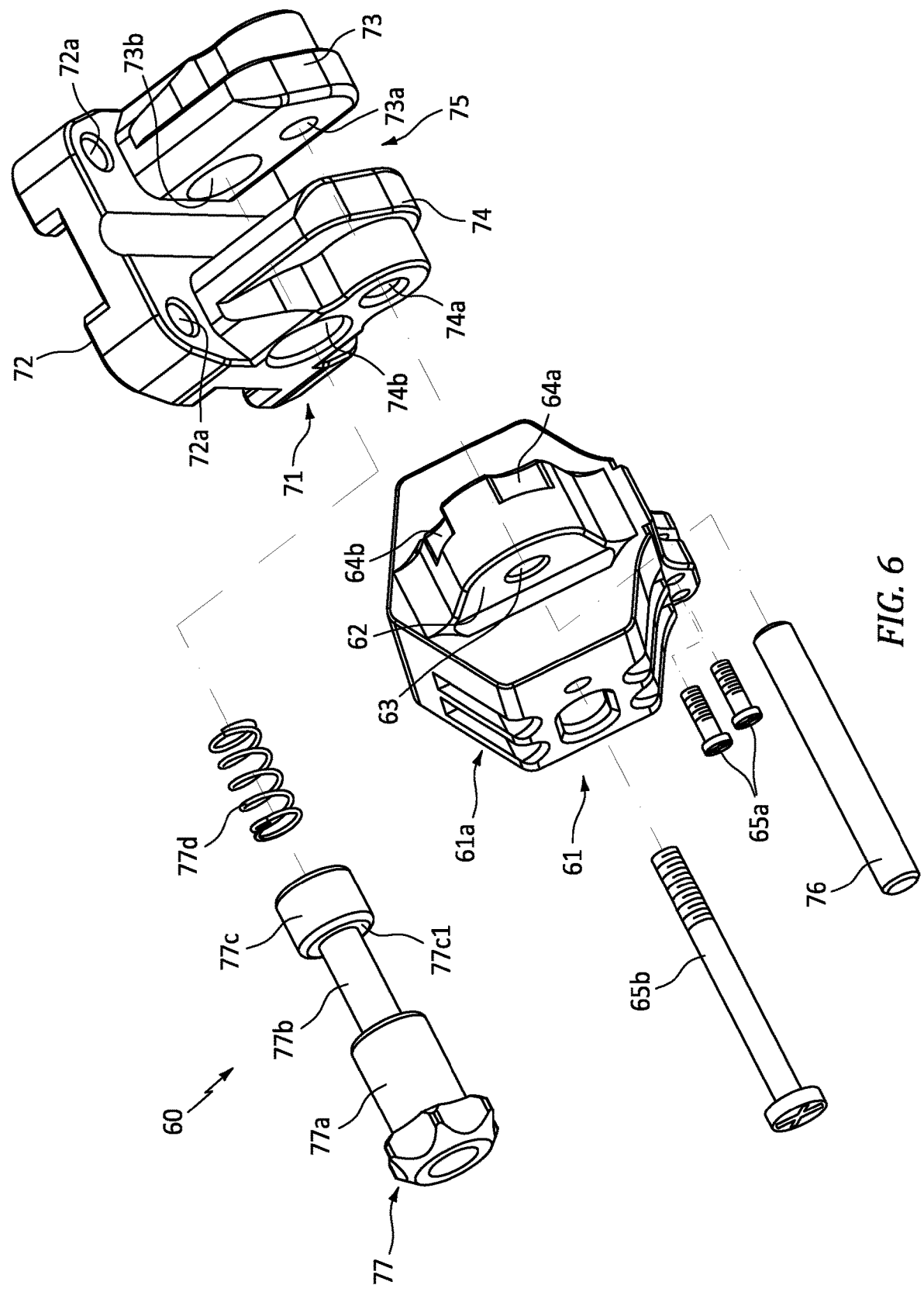
FIG. 6 is an exploded parts view of a landing gear hinge, in accordance with one embodiment of the invention.
Figure 7A:
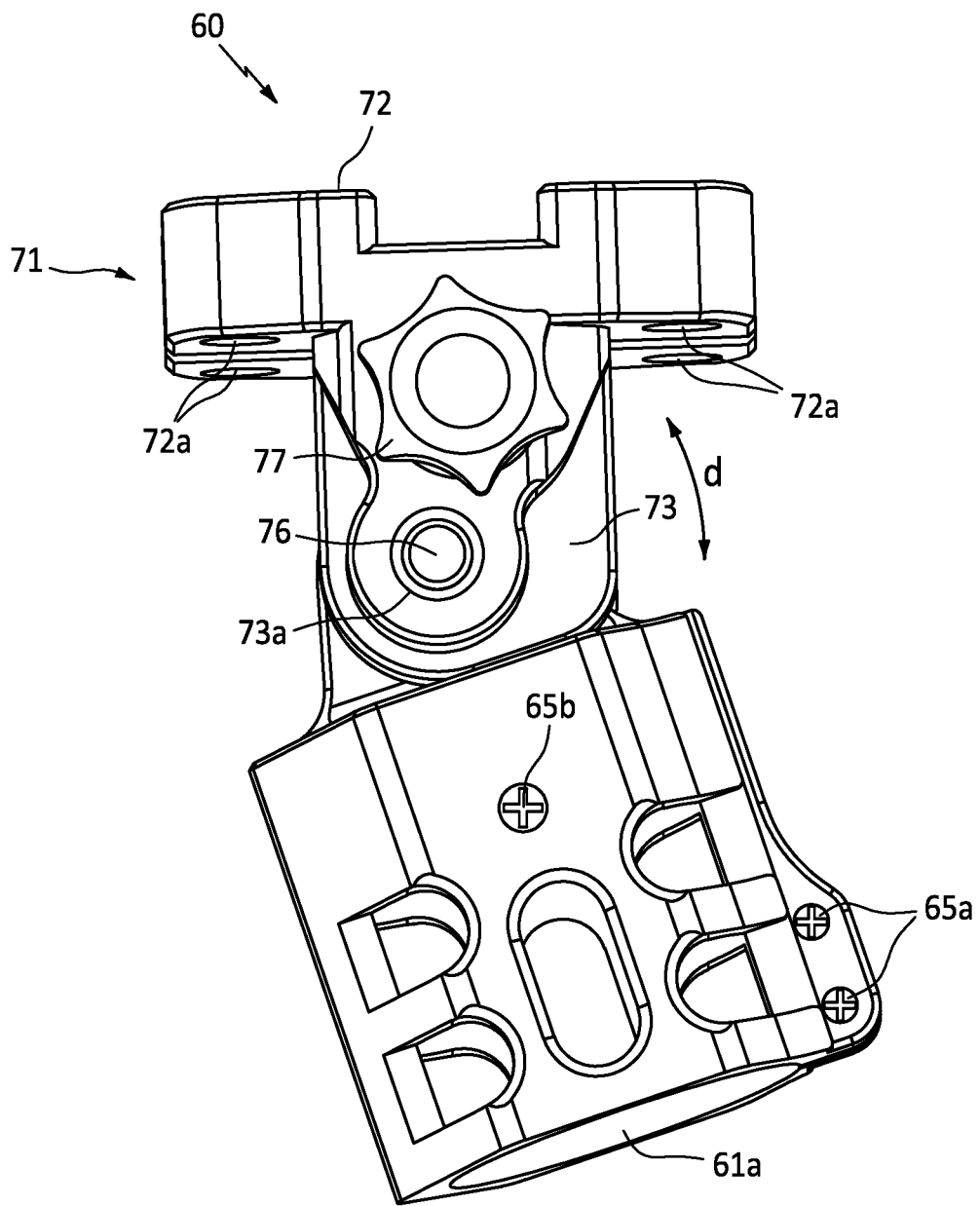
FIG. 7A is a perspective view of a landing gear hinge of the heavy-lift UAV frame in the ready for flight position, in accordance with one embodiment of the invention.
Figure 7B:
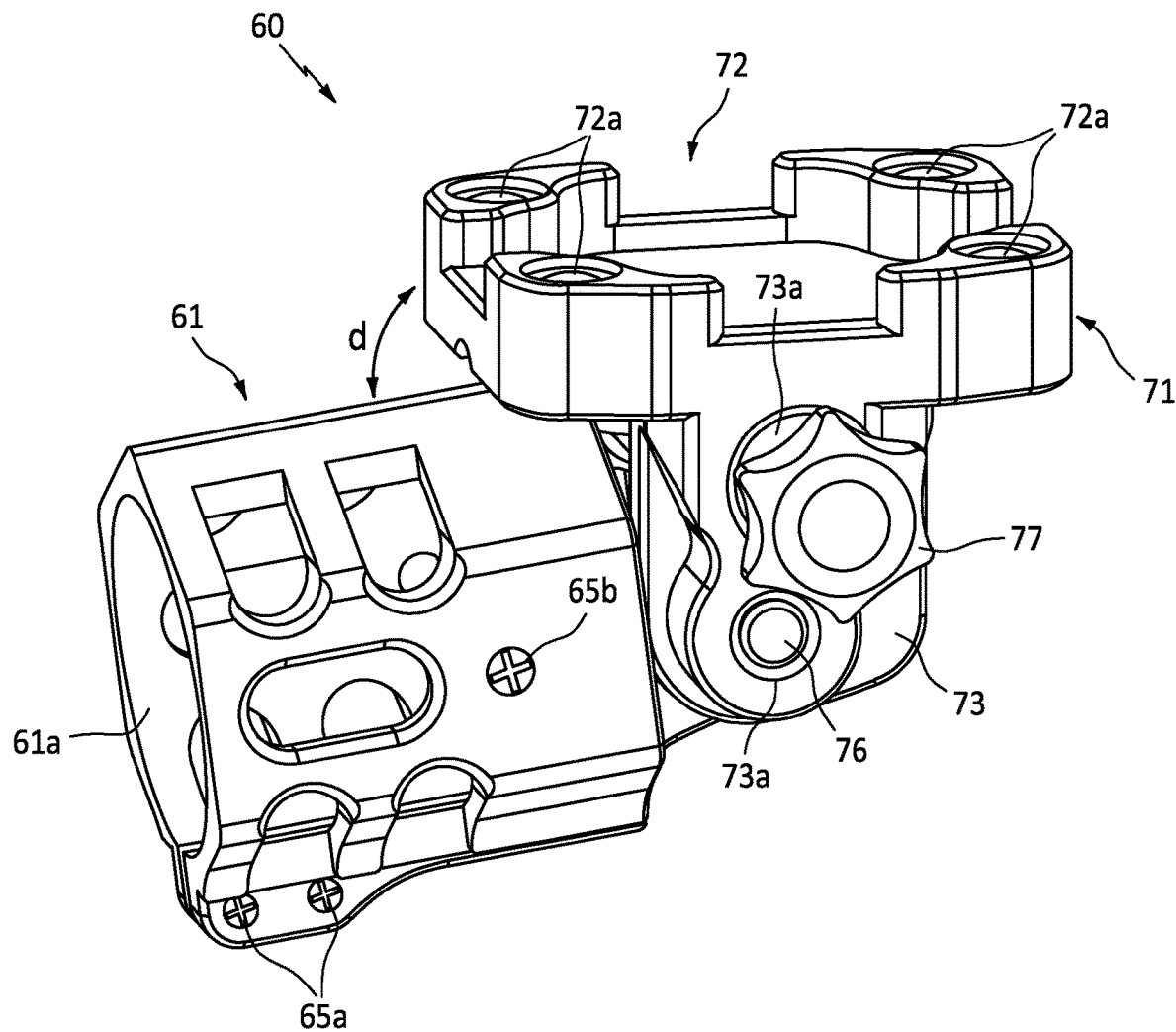
FIG. 7B is a perspective view of a landing gear hinge of the heavy-lift UAV frame in the storage position, in accordance with one embodiment of the invention.

FIGS. 6, 7A and 7B illustrate one embodiment of a landing gear hinge 60. As shown, the gear hinge 60 can include a first body section 61 having an open first end that leads to a hollow interior space 61a for receiving the first end 51a of a landing gear leg 50. The gear hinge can also include a semi-circular shaped protrusion 62 extending opposite to the open first end for positioning within the channel 75 of the second body section 71.

In one embodiment, a central aperture 63 can be positioned through the protrusion to engage the below described pivot pin 76. Likewise, a plurality of positional grooves 64a and 64b can be located along the outer edges of the protrusion for engagement by the locking pin 77.

In one embodiment, a pair of leg clamping screws 65a are provided so as to allow a user to tighten the hinge onto a leg that is positioned within the hollow interior space 61a, and an elongated safety screw 65b is removably positioned through the horizontal channel 52 of the gear leg secured within the hollow interior space to prevent separation of the leg and hinge.

The gear hinge can also include a second body section 71 having a top mounting surface 72 with a plurality of apertures 72a extending therethrough. Apertures 72a including a shape, size and orientation that is complementary to the shape, size and orientation of apertures 16b located along the corners 16 of the bottom plate 14, so as to receive mounting hardware 72b therethrough.

In one embodiment, a pair of arms 73 and 74 can extend outward in a direction opposite to the top mounting surface and can form a channel 75 for receiving the protrusion 62 of the first body section. Each of the arms can include apertures 73a/73b and 74a/74b which can be aligned such that 73a/74a and 73b/74b are in a linear relationship, respectively.

As shown, a pivoting pin 76 can be positioned through apertures 73a, 63 and 74a when the first and second body sections are connected in order to permit both sections to pivot (see arrow d), relative to the other.

In one embodiment, a locking pin 77 can be positioned through the second set of apertures 73b and 74b to selectively engage the positional groves 64a and 64b of the first body section, to orient the gear hinge in either the flight-ready or storage position.

In the illustrated embodiment, the locking pin 77 can include a first end 77a, a middle section 77b, a second end 77c and a compression spring 77d. In the preferred embodiment, the middle portion 77b can include a diameter that is less than the diameter of the first and second ends 77a and 77c, so as to result in the second end having a shoulder section 77c1 extending 90 degrees radially and perpendicularly to the outer surface of the middle portion.

In the assembled configuration, the compression spring 77d can be positioned against a ledge within the aperture 74b, so as to position the second end 77c of the pin within the channel area 75 in order to engage one of the groves 64a or 64b in the resting position. Such a feature working to automatically lock the gear hinge in either the flight ready or storage position unless acted on by a user.

In order to switch between the flight ready and storage positions, a user can impart a pushing force against the first end 77a of the pin which will cause the spring 77d to compress and allow the second end 77c to disengage the grove 64a or 64b and move into the second aperture 74b. At this time, the narrow middle portion 74c of the pin will be located within the channel 75 thus permitting rotation of the first and second body sections 61 and 71 to transition between the flight ready position and the storage position.

Figure 8A:
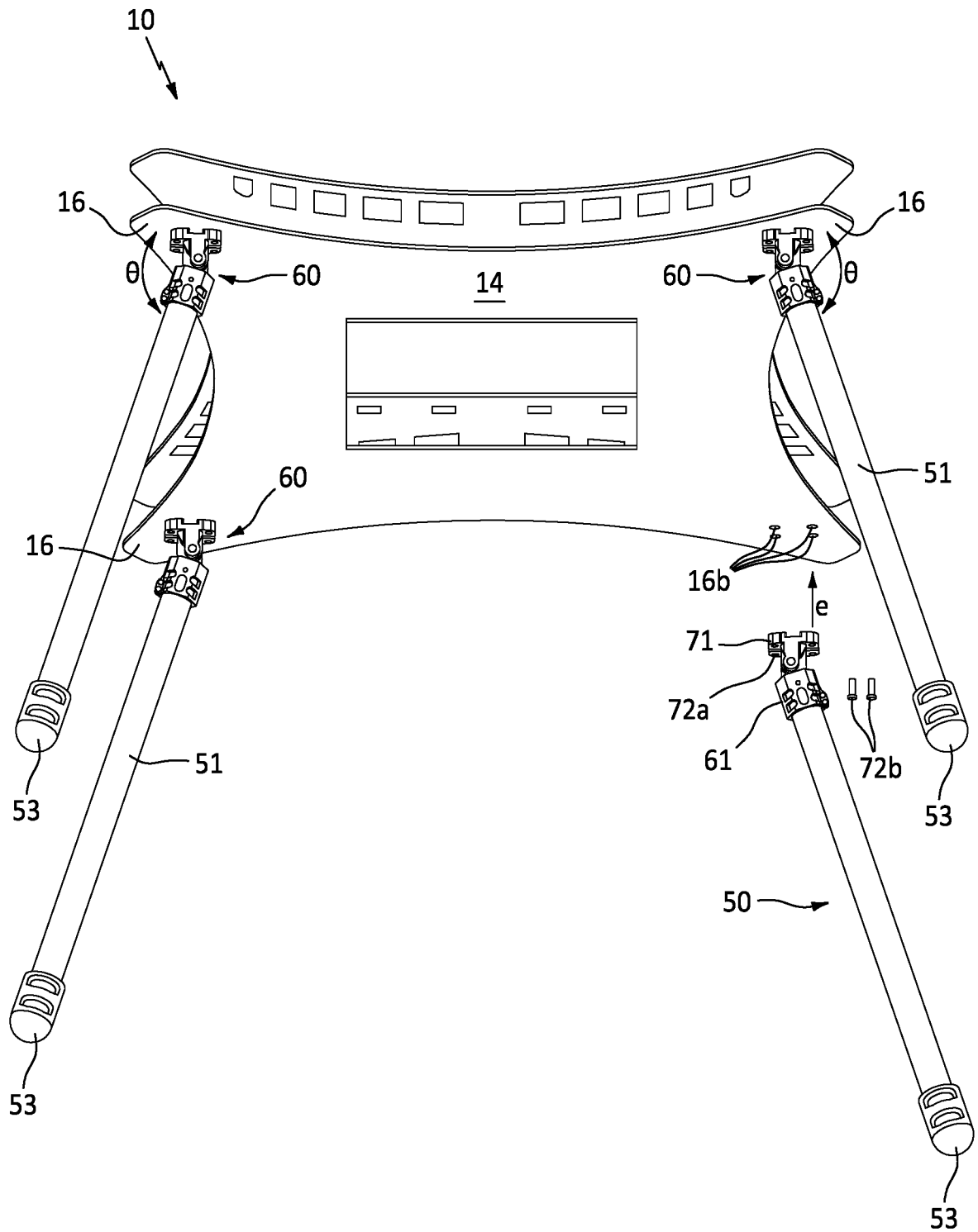
FIG. 8A is a perspective view of the heavy-lift UAV frame with the landing gear in the ready for flight position, in accordance with one embodiment of the invention.
Figure 8B:
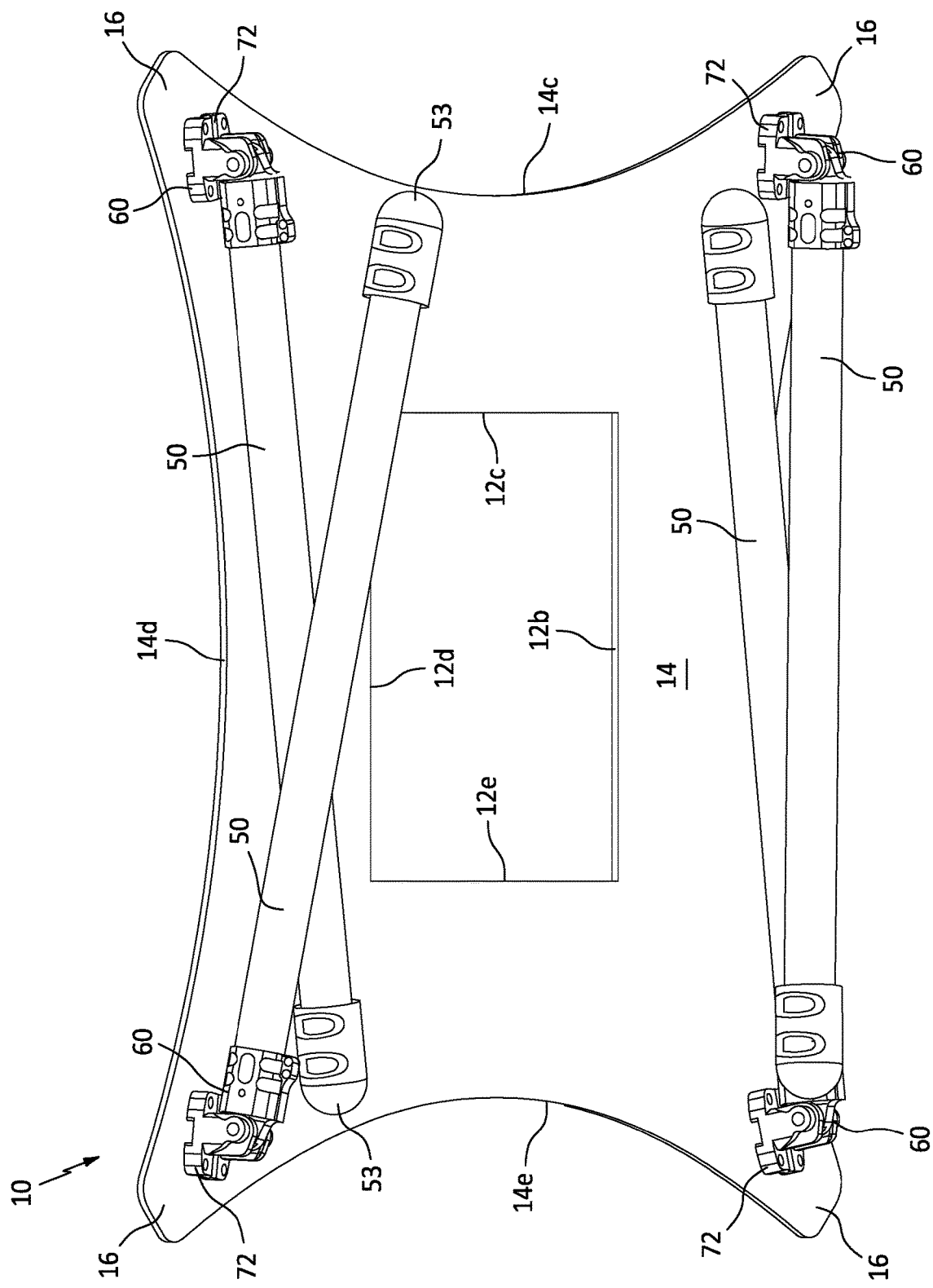
FIG. 8B is a perspective view of the heavy-lift UAV frame with the landing gear in the storage position, in accordance with one embodiment of the invention.

In the preferred embodiment, when the locking pin 77 is engaged with grove 64a, the hinge 60 will be in the flight-ready position shown at FIGS. 7A and 8A, and when the locking pin is engaged with grove 64b, the hinge will be in the storage position shown at FIGS. 7B and 8B.

In this regard, it is noted that grove 64a will preferably include a shape and size that is complementary to the shape and size of the shoulder portion 77c1 of the locking pin so as to prevent or minimize play/movement of the hinge and landing gear leg 50 when the system is in the flight ready position. Conversely, grove 64b will preferably include a shape and size that is slightly larger than the shape and size of the shoulder portion 77c1 of the locking pin, so as to allow limited movement of the hinge and landing gear arm when the system is in the storage position.

This limited movement will permit the landing gear legs to cross one another as the gear folds for storage. This movement ideally will be suitable for providing movement of the hinge of between about 2 and 4 degrees; however other embodiments allowing for different movement amounts and angles are also contemplated.

As shown best in FIG. 8A, the first end of each leg 51 can be positioned inside the first end of the gear hinge 61, and the second end of each gear hinge 71 can be positioned along one corner 16 of the bottom plate 14 (See arrow e). At this time, mounting apertures 72a will be aligned with plate apertures 16b, and so as to receive mounting hardware 72b, such as the illustrated screws, for example, to secure each landing gear hinge and leg onto the bottom of the frame. When fully installed, the gear hinges 60 can pivot each leg between the fully extended and ready for flight position and the storage position.

In the flight ready position, each of the legs will preferably be oriented so as to extend outward from the respective sides of the main body plate 14 at an angle θ of [INSERT] degrees. Such a feature ensuring the landing gear does not affect a payload suspended beneath the bottom of the drone during flight. Of course, other embodiments are contemplated wherein the legs are positioned at a different angle.

As shown in FIG. 8B, wherein the landing gear is in the storage position, each gear hinge 60 and attached leg 50 can include a length/assembled dimension (e.g., distance between elements 72 and 53) that is complementary to the length of one side of the main body 14 between edges 16 so as to be positioned between sides 14c and 14e at a location beneath the central body walls 12b and 12d. These dimensions allow the landing gear to be completely positioned beneath the frame in the storage position such that the corner members 15 and 16 will be the outermost components of the entire assembly. Such a design advantageously allows the sturdy corner members to protect the landing gear legs against impacts with foreign objects when the UAV boom arms and landing gear is retracted for storage and/or transport.

Additionally, because the landing gear hinges 60 are positioned angularly θ away from the corners of the main body in the flight ready position, the landing gear legs will be positioned at an inverse angle that is toward the center of the frame in the folded position. As such, the legs 50 will necessarily cross one another along the midway portion of the frame 14. For this reason, the limited movement described above with regard to grove 64b permits one leg on each side to be fully perpendicular relative to the main body, and the other leg on each side to be slightly angular via the allowed 2-4 degrees. Such a feature permits either leg to be positioned above or below the other in the folded and storage position while remaining locked and unable to fully extend to the flight ready position without a user engaging the locking pin 77.

Although dimensions are not critical, in the preferred embodiment, the main body 11 can preferably include a diagonal length between each corner section of approximately 30 inches. Likewise, each leg 50 and gear hinge 60 combination can preferably include a length of approximately [INSERT] inches from end to end. Such dimensions being suitable for allowing each boom to support two engines having 32-inch propellers giving the frame a lifting capacity of over 1,000 pounds, while permitting the landing gear to transition between the flight ready and storage positions shown. Of course, other sizes are also contemplated.

As described herein, one or more elements of the heavy-lift UAV frame 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A UAV frame, comprising:
a symmetrical-shaped central main body portion having a plurality of side walls and a recessed bottom wall;
a top plate having a central aperture, said top plate being secured along a top portion of the central main body;
a bottom plate that is secured along a bottom portion of the central main body;
a plurality of corner members that are defined by the top plate and the bottom plate;
a plurality of gear hinges that are positioned along a bottom surface of the bottom plate beneath one of the plurality of corner members; and
a plurality of elongated landing gear legs, each of the landing gear legs being connected to one of the plurality of landing gear hinges,
wherein each of the plurality of landing gear legs are configured to pivot between a ready for flight position and a storage position.

2. The frame of claim 1, wherein each of the plurality of landing gear legs and gear hinges include an assembled dimension that is complementary to a dimension of one of the plurality of side walls of the central body portion.

3. The frame of claim 1, wherein in the each of the gear hinges are configured to independently transition each of the plurality of landing gear legs between the ready for flight position and the storage position.

4. The frame of claim 3, wherein in the ready for flight position, each of the plurality of elongated landing gear legs extend diagonally outward from one of the plurality of corner members.

5. The frame of claim 3, wherein in the storage position, each of the plurality of elongated landing gear legs extend diagonally inward from one of the plurality of corner members.

6. The frame of claim 3, wherein in the storage position, each of the plurality of elongated landing gear legs are positioned beneath the central body portion.

7. The frame of claim 3, wherein each of the plurality of landing gear hinges includes a first body section having an opening for receiving a first end of one of the landing gear legs.

8. The frame of claim 7, wherein each of the plurality of landing gear hinges includes a second body section that is pivotally connected to the first body section.

9. The frame of claim 8, further comprising:
a spring loaded locking pin that is connected to each of the first body section and the second body section, said locking pin functioning to secure a respective hinge in one of the ready for flight position or the storage position.

10. The frame of claim 9, further comprising:
a plurality of apertures located along a distal end of the second body section.

11. The frame of claim 10, wherein each of the plurality of gear hinges are secured onto the frame via hardware located through the plurality of apertures.

* * * * *